United States Patent
Nagashima (10) Patent No.: US 7,586,819 B2
(45) Date of Patent: Sep. 8, 2009

(54) OPTICAL PICKUP DEVICE

(75) Inventor: Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 501 days.

(21) Appl. No.: 11/598,729

(22) Filed: Nov. 14, 2006

(65) Prior Publication Data

US 2007/0109931 A1    May 17, 2007

(30) Foreign Application Priority Data

Nov. 14, 2005    (JP)    ............................. 2005-328656

(51) Int. Cl.
*G11B 7/00* (2006.01)
(52) U.S. Cl. .................. 369/44.37; 369/112.05
(58) Field of Classification Search .............. 369/44.37, 369/44.41, 44.23, 112.03, 112.05, 112.07, 369/112.12
See application file for complete search history.

(56) References Cited

U.S. PATENT DOCUMENTS

| | | | |
|---|---|---|---|
| 5,894,464 A * | 4/1999 | Kim et al. ............... | 369/112.12 |
| 6,130,872 A * | 10/2000 | Sugiura et al. ......... | 369/112.04 |
| 6,512,608 B2 * | 1/2003 | Ohyama ................... | 369/44.37 |
| 6,928,035 B2 * | 8/2005 | Komma et al. ........... | 369/44.37 |
| 6,937,554 B2 * | 8/2005 | Ohuchida .............. | 369/112.15 |
| 6,950,384 B2 * | 9/2005 | Arai et al. ................... | 369/121 |

FOREIGN PATENT DOCUMENTS

JP    A-2000-076688    3/2000

* cited by examiner

*Primary Examiner*—Thang V Tran
(74) *Attorney, Agent, or Firm*—Morgan Lewis & Bockius LLP (57) ABSTRACT

An optical pickup device includes a two-wavelength composite light source that can emit laser beams for a CD and for a DVD, a light source that can emit a laser beam for a BD, a hologram element and a photo detector. When spots formed on the photo detector by 0 order light generated by diffraction of the three laser beams in the hologram element are first, second and third spots in the descending order of the wavelength of the laser beams, an attachment angle of the two-wavelength composite light source is adjusted so that positions of the third spot and the second spot match substantially each other while a position of the first spot is shifted from the position of the second spot in the same direction as a diffraction direction of +1st diffracted light.

8 Claims, 10 Drawing Sheets

OPTICAL PICKUP DEVICE

This application is based on Japanese Patent Application No. 2005-328656 filed on Nov. 14, 2005, the contents of which are hereby incorporated by reference.

BACKGROUND OF THE INVENTION

1. Field of the Invention

The present invention relates to an optical pickup device that is capable of recording information on an optical recording medium or reading out information recorded on an optical recording medium using a light source emitting light toward a recording layer of the optical recording medium. In particular, the present invention relates to a structure of the optical pickup device that support three wavelengths and can downsize a light receiving portion of a photo detector and the photo detector itself.

2. Description of Related Art

There are many types of the optical recording media including a compact disk (hereinafter referred to as a CD), a digital versatile disk (hereinafter referred to as a DVD), a Blu-Ray Disk (hereinafter referred to as a BD) that is proposed recently as a medium having a large storage capacity, and the like. In order to read information recorded on these optical recording media or to write information on these optical recording media, an optical pickup device is used. Recently, there is being developed an optical pickup device that is capable of dealing with three types of optical recording media including the CD, the DVD and the BD.

It is general method for the optical pickup device to design an optical system so that a focal point of a light beam emitted from the light source is normally adjusted on a recording surface of the optical recording medium and a spot position of the light beam follows a track formed on the optical recording medium by obtaining a servo error signal. In such a design, for example, there is a three-beam type optical pickup device in which a diffraction grating is disposed between the light source and a objective lens so that the diffraction grating divides the light beam emitted from the light source into three beams, which are projected to the optical recording medium, thereby the tracking servo signal is obtained from light information detected from reflected light of the three beams.

However, this three-beam type optical pickup device is required to be adjusted so that each of the three light beams generated by the diffraction grating is projected to the track formed on the optical recording medium with a predetermined relationship. Therefore, supposing that one optical pickup device is capable of emitting light beams having three wavelengths for a CD, a DVD and a BD, usage of this three-beam type may increase a burden of the adjusting work. In addition, the above-mentioned adjustment will be difficult particularly for a BD because it is necessary to minimize a beam spot condensed onto the recording surface of the medium formed by the light beam emitted from the light source.

For this reason, it is not easy to adopt the above-mentioned three-beam type for the optical pickup device having three light sources of three wavelengths for a CD, a DVD and a BD. Recently, there is proposed another technique about the optical pickup in which the light emitted from the light source and reflected by the optical recording medium is diffracted by a diffraction hologram element, and the diffracted light is received by a detector so that a servo error signal including a focus error signal and a tracking error signal are obtained. For example, JP-A-2000-76688 discloses an optical pickup using the above-mentioned technique, which can support a plurality of types of optical recording media using different wavelengths by a simple structure. If this technique utilizing the diffraction hologram is adopted, it is possible to obtain a reliable servo error signal without using the above-mentioned three-beam type.

Figure 10A:
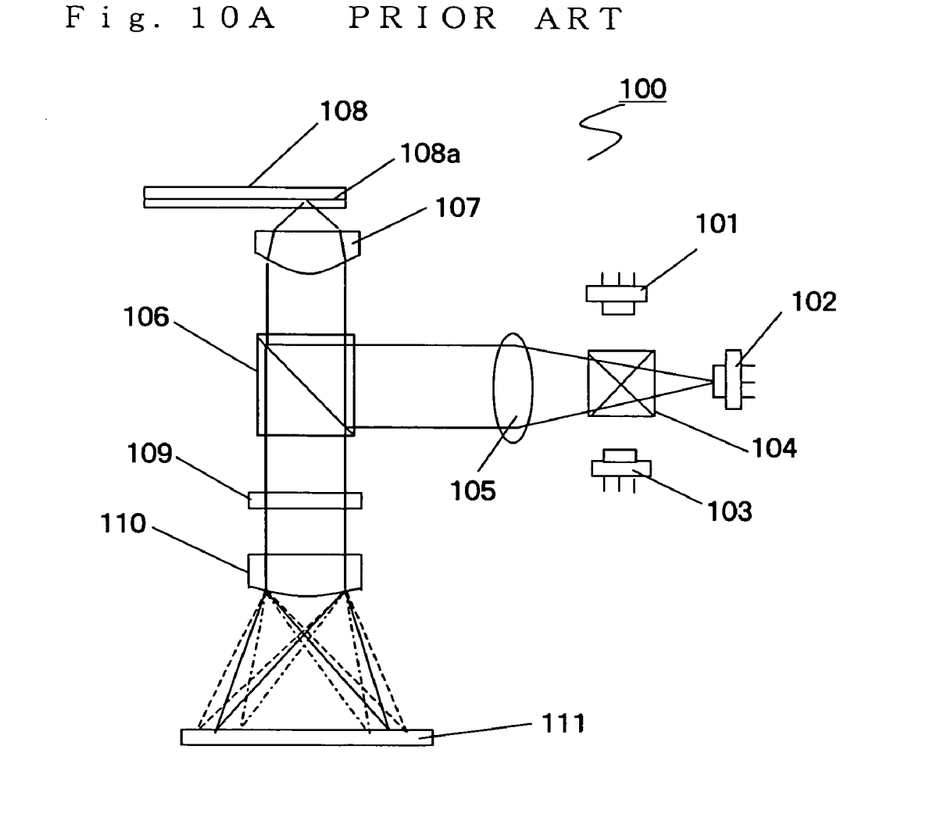
FIG. 10A is a schematic diagram showing an optical system of a conventional optical pickup device.
Figure 10B:
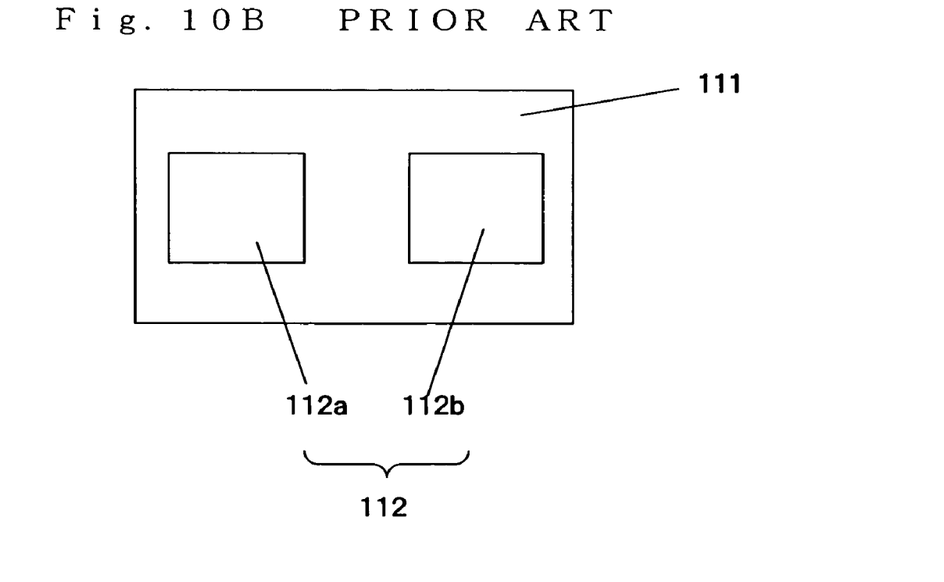
FIG. 10B is a schematic plan view showing a structure of a detection surface of a photo detector provided to the conventional optical pickup device.

Considering this, the optical pickup device having a structure as shown in FIGS. 10A and 10B can be supposed as an optical pickup device having light sources of three wavelengths supporting a CD, a DVD and a BD. FIG. 10A is a schematic diagram showing an optical system of an optical pickup device, and FIG. 10B is a plan view showing a general structure of a detection surface of a photo detector provided to the optical pickup device. Numeral 100 is an optical pickup device, numeral 101 is a semiconductor laser for a CD, numeral 102 is a semiconductor laser for a DVD, and numeral 103 is a semiconductor laser for a BD. Note that distances between a collimator lens 105 and the light emission points of the three semiconductor lasers 101-103 are equal to each other. In addition, the semiconductor laser 101 emits a light beam having a wavelength of 780 nm, the semiconductor laser 102 emits a light beam having a wavelength of 650 nm, and the semiconductor laser 103 emits a light beam having a wavelength of 405 nm.

Numeral 104 is a dichroic prism, which leads the light beams emitted from the semiconductor lasers 101-103 to the collimator lens 105. The collimator lens 105 converts the entering light beam into parallel rays. The light beam that passed through the collimator lens 105 is reflected by a beam splitter 106 and is condensed by the objective lens 107 onto a recording surface 108a of an optical recording medium 108. Then, the light beam is reflected by the recording surface 108a, passes through the beam splitter 106, and is led to a hologram element 109. The hologram element 109 works as a diffraction grating, and the light beam that passes through the hologram element 109 is diffracted so that ±1st order light beams are generated. The ±1st order light beams pass through a condenser lens 110 and are condensed onto a light receiving portion 112 of a photo detector 111. Note that the light receiving portion 112 is divided into two portions including a light receiving portion 112a for receiving +1st order light and a light receiving portion 112b for receiving −1st order light as shown in FIG. 10B.

In this way, when an optical pickup device 100 is structured, it is possible to structure an optical pickup device easily which has light sources of three wavelengths supporting a CD, a DVD and a BD and can obtain an appropriate servo error signal. However, in this structure, a diffraction angle of the light beam that passes the hologram element 109 is changed in accordance with a wavelength of the light beam. Therefore, as shown in FIG. 10A, the diffraction angle by the hologram element 109 increases with respect to the light beam for BD (shown by a dot and dashed line), the light beam for DVD (shown by a solid line) and the light beam for CD ((shown by a broken line) in this order, so that focus positions of the light beams entering the light receiving portion 112 of the photo detector 111 are extended. For this reason, an area of the light receiving portion 112 of the photo detector 111 should be enlarged, which causes an increase of cost for manufacturing the photo detector 111 and an increase of size of the photo detector 111.

SUMMARY OF THE INVENTION

An object of the present invention is to provide an optical pickup device including light sources of three wavelengths, a hologram for generating a servo control signal and a photo detector, which can reduce an area of light receiving portion (detector) of the photo detector. Another object of the present invention is to realize a small size of the photo detector by reducing the area of light receiving portion of the photo detector.

An optical pickup device according to the present invention includes three light sources having different wavelengths, a condenser lens for condensing light emitted from the light sources onto a recording surface of the optical recording medium, a hologram element for diffracting light reflected by the recording surface after condensed by the condenser lens, and a photo detector having two light receiving portions for receiving separately +1st order light and −1st order light of the light diffracted by the hologram element. The three light sources include a first light source, a second light source and a third light source in descending order of wavelength thereof. Light emitted from the first through the third light sources are referred to as first light, second light and third light, respectively. Light spots formed on the photo detector by 0 order light of the diffracted light of the first through the third light are referred to as a first spot, a second spot and a third spot, respectively. Then, the three light sources is disposed so that a position of either one of the first spot and the third spot matches substantially a position of the second spot, and a position of the other is shifted from the position of the second spot in either one of two diffraction directions including a diffraction direction of the +1st order light and a diffraction direction of the −1st order light. If the positions of the second spot and the third spot match substantially each other, one of the light receiving portions that exists on the side where the first spot is shifted from the second spot is divided into a light receiving area for receiving 1st order diffracted light of the first light and a light receiving area for receiving 1st order diffracted light of the second light and the third light. If the positions of the second spot and the first spot match substantially each other, one of the light receiving portions that exists on the side opposite to the side where the third spot is shifted from the second spot is divided into a light receiving area for receiving 1st order diffracted light of the third light and a light receiving area for receiving 1st order diffracted light of the first light of the second light.

According to this structure, concerning 1st order diffracted light of longest wavelength light that inherently forms a spot on an outer most part of the light receiving portion because it has a largest diffraction angle by the hologram element due to the longest wavelength or 1st order diffracted light of shortest wavelength light that inherently forms a spot on an inner most part of the light receiving portion because it has a smallest diffraction angle by the hologram element due to the shortest wavelength, it is possible to make a spot position in either the light receiving portions for receiving the +1st order light or the light receiving portion for receiving the −1st order light close to a position of a spot formed by light of medium wavelength or to form the spot between two other wavelength spots. In this case, concerning the other light receiving portion, the spot position is distant from the two other wavelength spots and is formed on further outer or inner side. However, since its distance increases, it is possible to separate the light receiving portion where the spot is formed from the light receiving portion for two other wavelengths. In other words, for the former case it is possible to reduce an area of the light receiving portion, and in the latter case the area of the light receiving portion is scarcely increased. For this reason, a total area of the light receiving portion disposed on the photo detector can be reduced, so that a cost of the photo detector can be reduced.

Furthermore, in the optical pickup device having the structure described above according to the present invention, the first light source and the second light source are integrated to form a two-wavelength composite light source so that positions of the second spot and the third spot match substantially each other.

According to this structure, since the two-wavelength composite light source is used, the whole structure of the optical pickup device can be realized in a small size. In addition, since the two-wavelength composite light source is a structure in which light emission points of different wavelength light are arranged at a constant interval, a desired light source arrangement can be realized only by adjusting an attachment angle of the two-wavelength composite light source, so that a burden of an adjustment work can be reduced.

In addition, the present invention provides an optical pickup device including three light sources having different wavelengths, a condenser lens for condensing light emitted from the light sources onto a recording surface of the optical recording medium, a hologram element for diffracting light reflected by the recording surface after condensed by the condenser lens, and a photo detector having two light receiving portions for receiving separately +1st order light and −1st order light of the light diffracted by the hologram element. The three light sources include a first light source, a second light source and a third light source in descending order of wavelength thereof. Light emitted from the first through the third light sources are referred to as first light, second light and third light, respectively. Light spots formed on the photo detector by 0 order light of the diffracted light of the first through the third light are referred to as a first spot, a second spot and a third spot, respectively. Then, the three light sources is disposed so that when one of the first spot and the third spot is regarded as a reference spot, a position the second spot is shifted from a position of the reference spot in either one of two diffraction directions including a direction of the +1st order light and a direction of the −1st order light, while a position of the other spot that is not the reference spot is shifted from a position of the second spot in the same direction as the shift of the second spot. If the third spot is regarded as the reference spot, one of the light receiving portions that exists on the side where the second spot is shifted is divided into three light receiving areas for receiving 1st order diffracted light of the first through the third light separately. If the first spot is regarded as the reference spot, one of the light receiving portions that exists on the side opposite to the side where the second spot is shifted is divided into three light receiving areas for receiving the 1st order diffracted light of the first through the third light separately.

According to this structure, in either the light receiving portion for receiving the +1st order light or the light receiving portion for receiving the −1st order light, spots of the 1st order diffracted light of the light emitted from the three light sources can be condensed substantially at one point. Concerning the other light receiving portion, since the spot positions of the 1st order diffracted light of the light emitted from the three light sources are distant from each other largely, it is possible to divide the light receiving portion into parts where the spot are formed separately. In other word, for the former case it is possible to reduce an area of the light receiving portion largely, and in the latter case the area of the light receiving portion is scarcely increased. For this reason, a total area of the light receiving portion disposed on the photo detector can be reduced, so that a cost of the photo detector can be reduced.

Furthermore, in the optical pickup device having the structure described above according to the present invention, the first light source and the second light source are integrated to form a two-wavelength composite light source so that the reference point is the third spot.

According to this structure, the entire structure of the optical pickup device can be downsized by using the two-wavelength composite light source. In addition, since the two-wavelength composite light source is a structure in which light emission points of different wavelength light are arranged at a constant interval, a desired light source arrangement can be realized only by adjusting an attachment angle of the two-wavelength composite light source, so that a burden of an adjustment work can be reduced.

In addition, the optical pickup device having the structure described above according to the present invention further includes an optoelectronic integrated circuit disposed in a gap portion formed between the light receiving areas for processing an optical signal and an electric signal of the photo detector.

According to this structure, the optoelectronic integrated circuit (OEIC) to be disposed on the photo detector can be disposed on the photo detector efficiently, so a size of the photo detector can be reduced.

DESCRIPTION OF THE PREFERRED EMBODIMENTS

Now, an embodiment of the present invention will be described with reference to the attached drawings. Note that the embodiment shown here is merely an example, so the present invention is not limited to the embodiment shown here.

Figure 1:
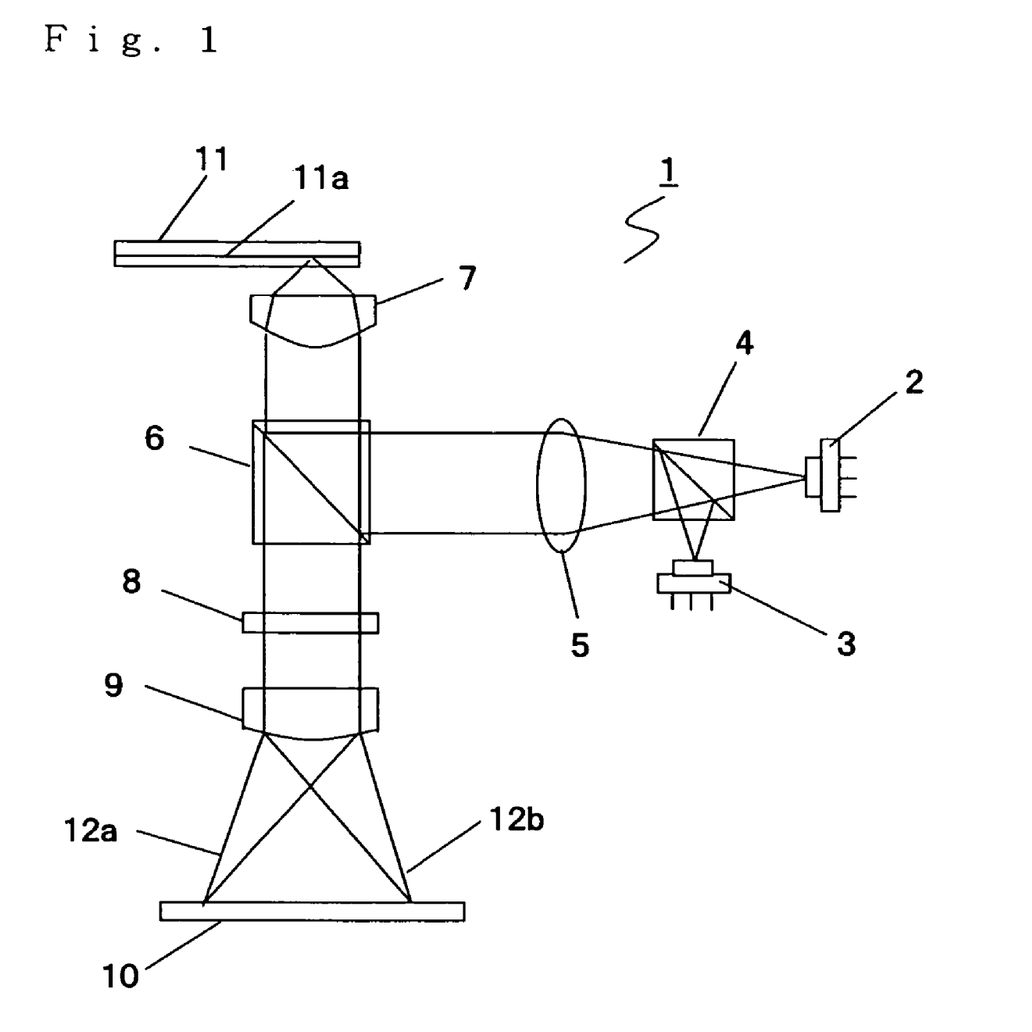
FIG. 1 is a schematic diagram showing an optical system of an optical pickup device according to a first embodiment.

In the first place, a first embodiment will be described. FIG. 1 is a schematic diagram showing an optical system of an optical pickup device according to a first embodiment. Numeral 1 denotes an optical pickup device, which supports three types of optical recording media 11 including a CD, a DVD and a BD. The optical pickup device reads information recorded on a recording surface 11a of the optical recording medium 11 by projecting a light beam toward the optical recording medium 11 and receiving light reflected by the same. The optical pickup device also writes information on the recording surface 11a by projecting a light beam toward the optical recording medium 11. This optical pickup device 1 includes, for example, a two-wavelength composite light source 2 that is capable of emitting two light beams having different wavelengths, a light source 3 that emits a light beam of a single wavelength, a dichroic prism 4, a collimator lens 5, a beam splitter 6, an objective lens 7, a hologram element 8, a condenser lens 9 and a photo detector 10. Hereinafter each of the optical elements will be described in detail.

The two-wavelength composite light source 2 is made up of a monolithic semiconductor laser having two light emission points that can emit a laser beam of 780 nm band supporting a CD and a laser beam of 650 nm band supporting a DVD. In addition, the light source 3 is a semiconductor laser that can emit a single wavelength laser beam of 405 nm band supporting a BD. Although the monolithic semiconductor laser is used as the two-wavelength composite light source 2 in the first embodiment, the present invention is not limited to this structure. For example, it is possible to use a hybrid semiconductor laser may be used, in which light sources manufactured separately are housed in one package.

The dichroic prism 4 allows the laser beams from the two-wavelength composite light source 2 that emits laser beams for a CD and a DVD to pass through, while it reflects the laser beam from the light source 3 that emits a laser beam for a BD. The laser beam that is allowed to pass through or is reflected by the dichroic prism 4 is sent to the collimator lens 5.

The collimator lens 5 converts the laser beam emitted from the two-wavelength composite light source 2 or the light source 3 into parallel rays. Here, the parallel rays are light that is the laser beam emitted from the two-wavelength composite light source 2 or the light source 3, in which all the light paths are substantially parallel with the optical axis. The parallel rays that have passed through the collimator lens 5 are sent to the beam splitter 6.

The beam splitter 6 has a function as a splitter element that splits a laser beam. It reflects the laser beam that has passed the collimator lens 5 and leads the laser beam to the optical recording medium 11, while it allows the laser beam reflected by the optical recording medium 11 to pass through and leads the laser beam to the photo detector 10. The laser beam reflected by the beam splitter 6 is sent to the objective lens 7.

The objective lens 7 condenses the laser beam reflected by the beam splitter 6 onto the recording surface 11a of the optical recording medium 11. The laser beam is reflected by the optical recording medium 11, passes through the objective lens 7, is led to the beam splitter 6, passes through the beam splitter 6 and is sent to the hologram element 8.

The hologram element 8 has a function as a diffraction grating, which diffracts the laser beam sent from the beam splitter 6. Then, ±1st order diffracted light diffracted by this hologram element 8 is received by the photo detector 10 via the condenser lens 9. The photo detector 10 includes light receiving portions (not shown) for receiving a +1st order light 12a and a −1st order light 12b diffracted by the hologram element 8. Information of the received light is converted into an electric signal and is supplied to an RF amplifier (not shown), for example. Then, this electric signal is used as a reproduction signal of data recorded on the recording surface 11a, a focus error signal for performing a focus control or a tracking error signal for performing a tracking control.

Although a part for receiving 0 order diffracted light (0 order light) among the diffracted light generated by the hologram element 8 is not provided on the photo detector 10 in the first embodiment, it is possible to provide a light receiving portion for receiving 0 order light.

Figure 2:
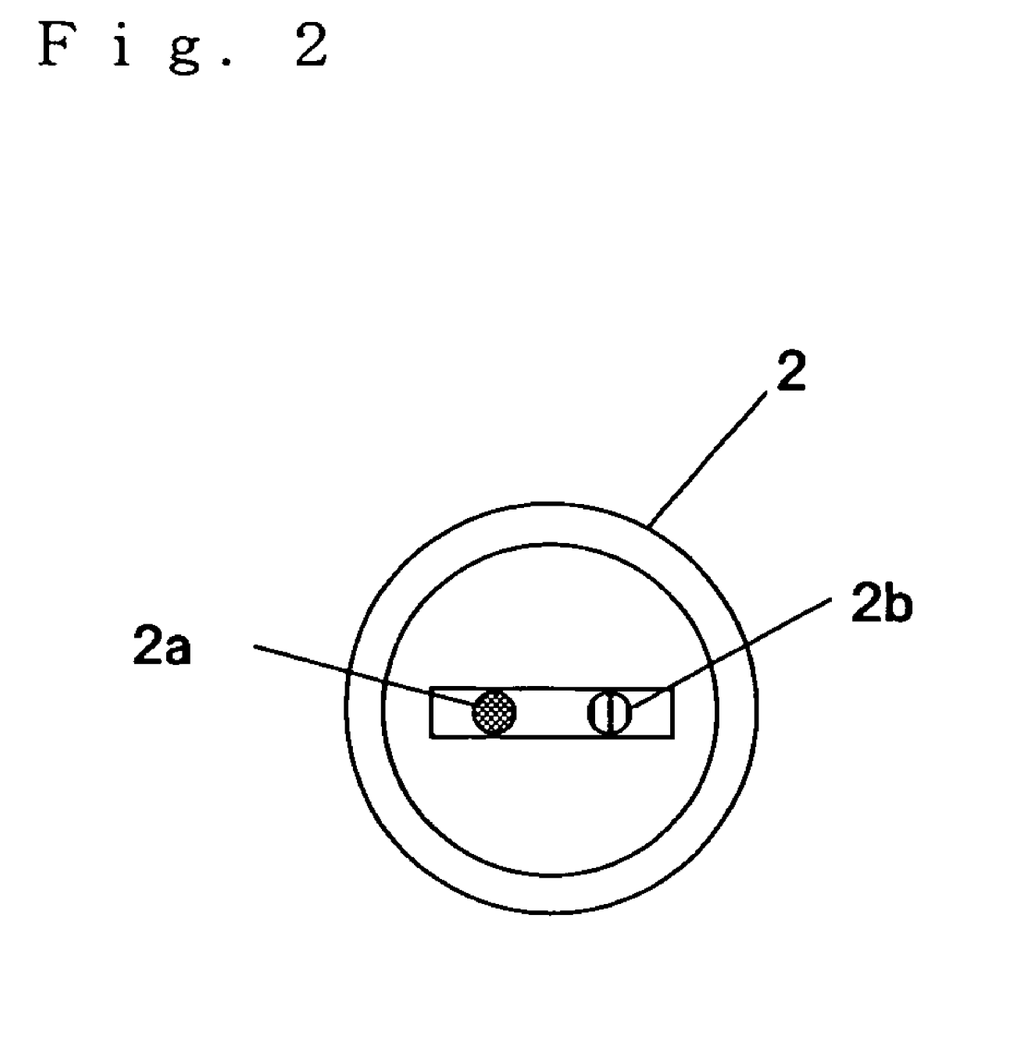
FIG. 2 is a schematic cross section showing a structure of light emission points of a two-wavelength composite light source of the optical pickup device according to a first embodiment.

Next, an adjustment of an attachment position of the two-wavelength composite light source 2 in the optical pickup device 1 having the structure described above will be described. FIG. 2 is a schematic cross section showing a structure of light emission points of a two-wavelength composite light source 2. As shown in FIG. 2, a light emission point 2a for emitting a laser beam for a CD and a light emission point 2b for emitting a laser beam for a DVD have a constant distance between them in the two-wavelength composite light source 2.

Figure 3A:
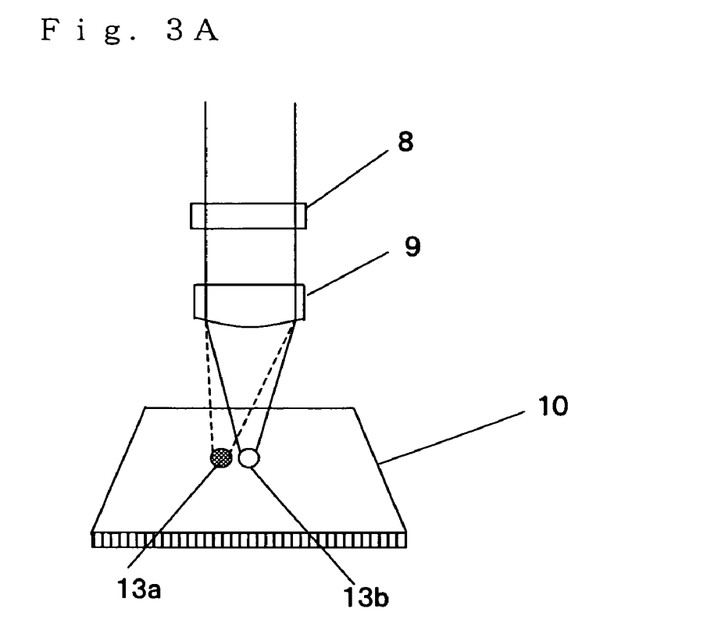
FIGS. 3A and 3B are explanatory diagrams for explaining beam spots formed on a photo detector by 0 order light generated by diffraction in a hologram element in the first embodiment.
Figure 3B:
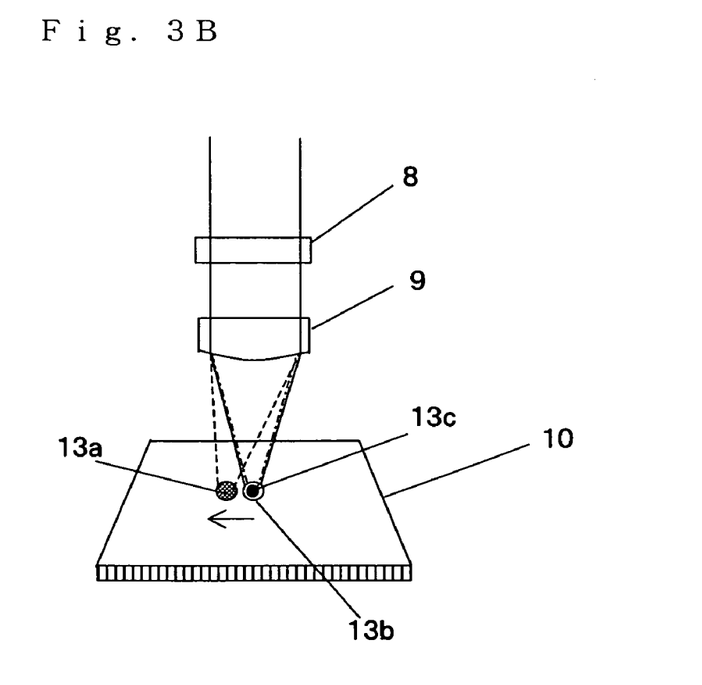

FIGS. 3A and 3B are explanatory diagrams for explaining beam spots formed on the photo detector 10 by the 0 order light generated by diffraction in the hologram element 8 among laser beams that are emitted from the two-wavelength composite light source 2 and the light source 3 and pass through the hologram element 8. FIG. 3A is an explanatory diagram for explaining a relationship between positions of the beam spots formed on the photo detector 10 by the 0 order light of the laser beam for a CD and a DVD emitted from the two-wavelength composite light source 2. FIG. 3B is an explanatory diagram for explaining a relationship between positions of the beam spots when the beam spot formed by the 0 order light of the laser beam for a BD emitted from the light source 3 is added to FIG. 3A.

As described above, positions of the light emission point 2a for a CD (a first light source) and the light emission point 2b for a DVD (a second light source) are separated from each other in the two-wavelength composite light source 2. Therefore, as shown in FIG. 3A, a first spot 13a formed on the photo detector 10 by the 0 order light of the laser beam for a CD emitted from the light emission point 2a and a second spot 13b formed on the photo detector 10 by the 0 order light of the laser beam for a DVD emitted from the light emission point 2b do not match and are formed at different positions.

Considering this point, an attachment angle of the two-wavelength composite light source 2 of this embodiment is adjusted, as shown in FIG. 3B, so that the second spot 13b generated by the laser beam for a DVD matches a third spot 13c formed on the photo detector 10 by the 0 order light of the laser beam for a BD emitted from the light source 3 (third light source), and that the first spot 13a generated by the laser beam for a CD is shifted in the same direction (as shown in FIG. 3B by an arrow) as the diffraction direction of the +1st order light 12a (see FIG. 1) generated by the diffracted in the hologram element 8.

Figure 4:
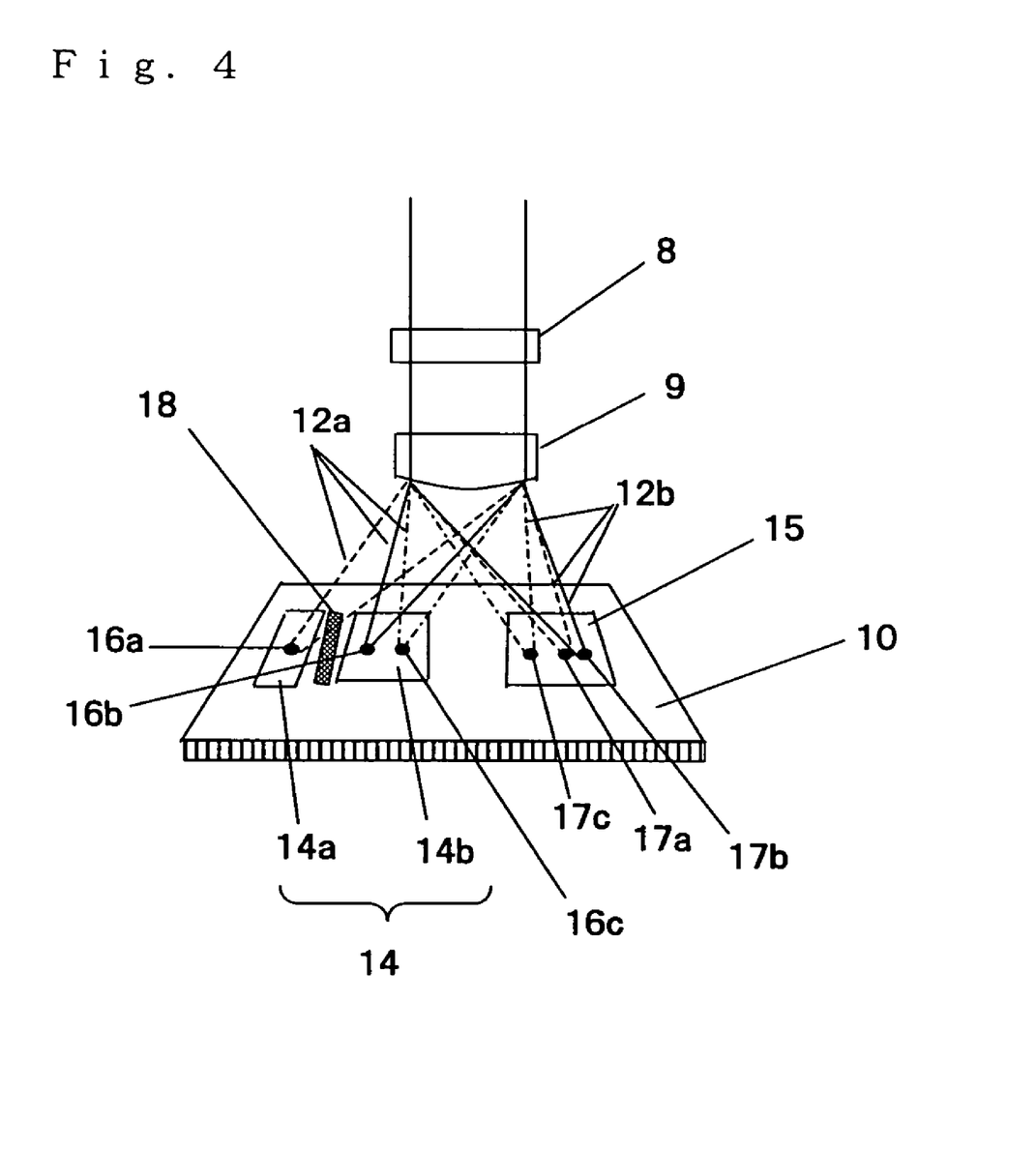
FIG. 4 is a schematic diagram showing schematically that ±1st order light generated by diffraction in the hologram element is received by light receiving portions of the optical pickup device of the first embodiment.

Next, actions of the structure in which the two-wavelength composite light source 2 and the light source 3 are arranged as descried above will be described. FIG. 4 is a schematic diagram showing schematically that +1st order light 12a and the −1st order light 12b of the laser beams for a CD, a DVD and a BD generated by diffraction in the hologram element 8 are received by light receiving portions 14 and 15 provided to the photo detector 10 in the optical pickup device of the first embodiment 1. In addition, FIG. 5 is a diagram for comparison with FIG. 4 and is a schematic diagram showing schematically that +1st order light 12a and the −1st order light 12b of the laser beams for a CD, a DVD and a BD generated by diffraction in the hologram element 8 are received by light receiving portions 14 and 15 when the light emission points of the laser beams are at the same position.

Figure 5:
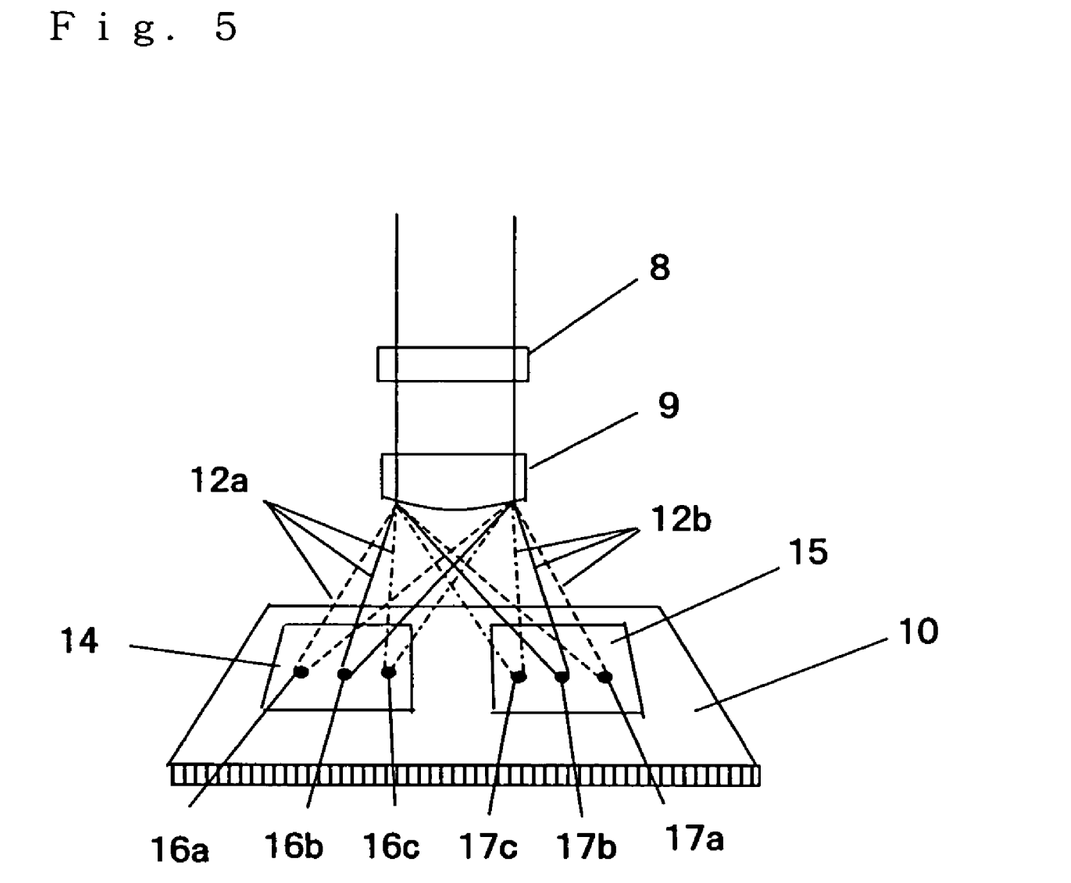
FIG. 5 is a schematic diagram for comparison with the optical pickup device of the first embodiment.

Note that numeral 14 denotes the light receiving portion for detecting the +1st order light 12a while numeral 15 denotes the light receiving portion for detecting the −1st order light 12b in FIGS. 4 and 5. In addition, the dotted and dashed line indicates the laser beam for a BD, the solid line indicates the laser beam for a DVD, and the broken line indicates the laser beam for a CD (likewise in the other drawings below).

As described above, the diffracted light after diffracted by the diffraction hologram element 8 has a larger diffraction angle as a wavelength of the laser beam is longer. Therefore, if the light emission points are at the same position, the positions of the spots formed on the light receiving portions 14 and 15 by the +1st diffracted light 12a and the −1st order light 12b of the laser beam are shifted outward in the order of the laser beams for a BD, a DVD and a CD as shown in FIG. 5.

However, in the first embodiment, as described above, the attachment angle of the two-wavelength composite light source 2 is adjusted so that a position 17a of the spot formed on the light receiving portion 15 by the −1st order light 12b of the laser beam for a CD is located between the positions 17b and 17c of the spots formed on the light receiving portion 15 by the −1st order light 12b of the laser beams for a DVD and for a BD as shown in FIG. 4. Therefore, compared with the case of FIG. 5, an area of the light receiving portion 15 on the −1st order light side can be reduced.

Although the position 17a of the spot of the −1st order light 12b of the laser beam for a CD is located between the positions 17b and 17c of the spots formed by the −1st order light 12b of the laser beams for a DVD and for a BD in the first embodiment, the present invention is not limited to this structure. It is possible that the spot position 17a of the −1st order light 12b of the laser beams for a CD is located outside and in a vicinity of the position 17b of the spot of the −1st order light 12b for DVD. In this case too, compared with the case of FIG. 5, it is possible to reduce an area of the light receiving portion 15 on the −1st order light side.

On the other hand, a position 16a of the spot formed on the light receiving portion 14 by the +1st diffracted light 12a of the laser beam for a CD is further distant from the positions 16b and 16c of the spots formed on the light receiving portion 14 by the +1st diffracted light 12a of the laser beams for a DVD and for a BD outward as shown in FIG. 4. For this reason, compared with the case of FIG. 5, it is necessary to increase an area of the light receiving portion 14 on the +1st diffracted light 12a side. However, a light receiving position for receiving the +1st diffracted light 12a of the laser beam for a CD is largely distant from the light receiving position for receiving the +1st diffracted light 12a of the laser beams for a DVD and for a BD in the first embodiment. Therefore, the light receiving portion 14 is divided into a light receiving area 14a for receiving the +1st diffracted light of the laser beam for a CD and a light receiving area 14b for receiving the +1st diffracted light of the laser beams for a DVD and for a BD. Thus, it is almost unnecessary to increase an area of the light receiving portion 14 compared with the case of FIG. 5.

Therefore, a total area of the light receiving portions 14 and 15 of the photo detector 10 provided to the optical pickup device of the first embodiment 1 can be reduced compared with the case of FIG. 5. Then, a gap portion 18 is generated when the light receiving portion 14 is divided, and an optoelectronic integrated circuit (OEIC, not shown) is disposed at the gap portion 18. For this reason, the optoelectronic integrated circuit can be disposed on the photo detector 10 efficiently so that the photo detector 10 can be downsized.

In the first embodiment described above, the attachment angle of the two-wavelength composite light source 2 is adjusted so that a position of the first spot 13a formed on the photo detector 10 by the 0 order light of the laser beam for a CD is shifted from the second and the third spots 13b and 13c (see FIGS. 3A and 3B) formed on the photo detector 10 by the 0 order light of the laser beams for a DVD and for a BD in the same direction as the diffraction direction of the +1st diffracted light 12a. Without being limited to this structure, however, it is possible to arrange so that the position of the first spot 13a is shifted from the second and the third spots 13b and 13c in the same direction as the diffraction direction of the −1st order light 12b.

Furthermore, the two-wavelength composite light source 2 used in the first embodiment has a structure for emitting laser beams for a CD and for a DVD. Without being limited to this structure, however, it is possible to modify the structure within a scope of the object of the present invention. In other words, for example, the two-wavelength composite light source may have a structure for emitting laser beams for a DVD and for a BD. In this case, an attachment position of the two-wavelength composite light source may be adjusted so that the spot positions of the first spot 13a generated by the laser beam for a CD (that is emitted from the light source supporting a single wavelength) and the second spot 13b generated by the laser beam for a DVD (see FIGS. 3A and 3B) match substantially each other, and that the position of the third spot 13c generated by the laser beam for a BD (see FIG. 3B) is shifted from the position of the second spot 13b in the same direction as the diffraction direction of the +1st diffracted light 12a.

Figure 6:
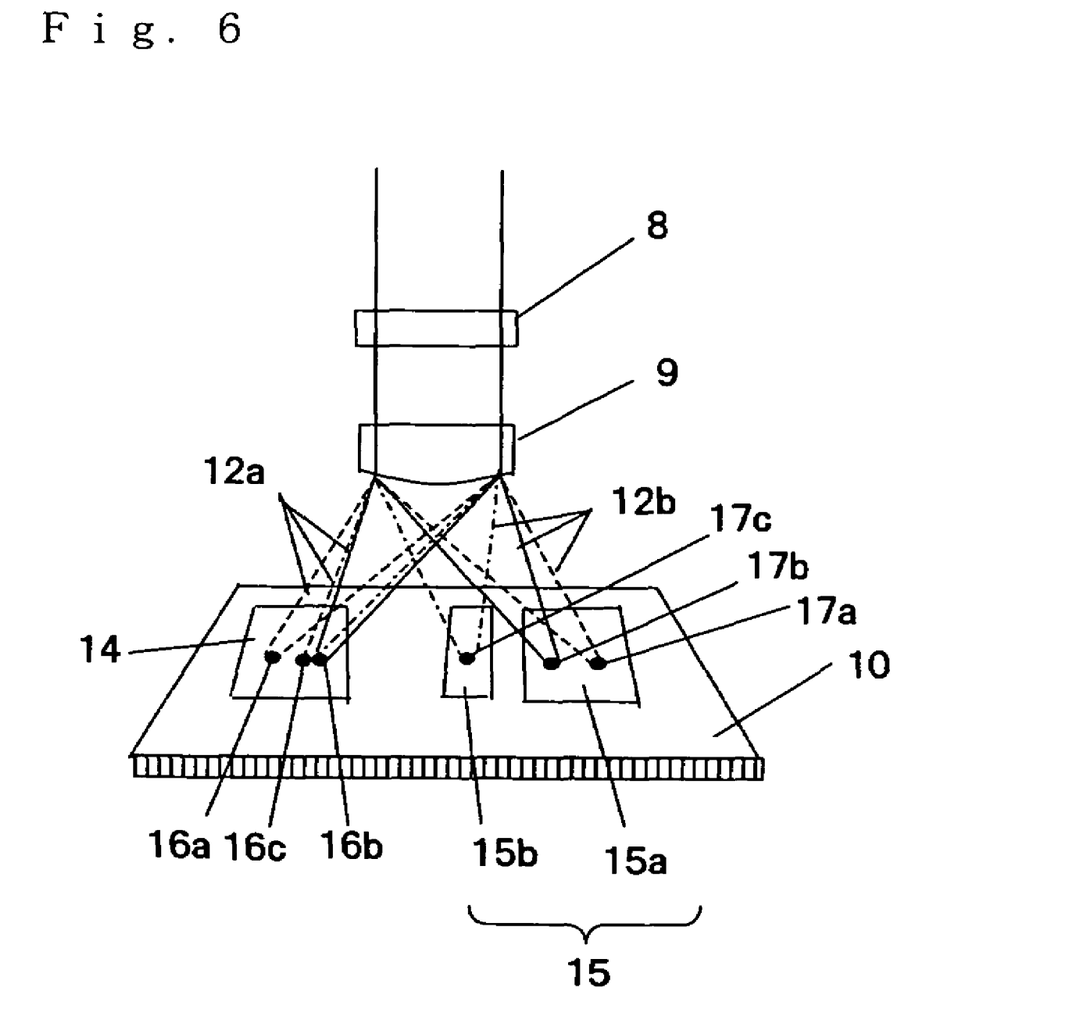
FIG. 6 is a schematic diagram showing a variation of the optical pickup device of the first embodiment.

In this case, as shown in FIG. 6, a position 16c of the spot formed on the light receiving portion 14 by the +1st diffracted light 12a of the laser beam for a BD can be located between the positions 16a and 16b of the spots formed on the light receiving portion 14 by the +1st diffracted light 12b of the laser beams for a CD and for a DVD. Therefore, an area of the light receiving portion 14 on the +1st diffracted light side can be decreased. On the other hand, the light receiving position for receiving the −1st order light 12a of the laser beams for a CD and for a DVD is distant largely from the light receiving position for receiving the −1st order light 12a of the laser beam for a BD. Therefore, the light receiving portion 15 is divided into the light receiving area 15a for receiving the +1st diffracted light of the laser beams for a CD and for a DVD and a light receiving area 15b for receiving the +1st diffracted light of the laser beam for a BD. For this reason, it is almost unnecessary to increase an area of the light receiving portion 14. Therefore, a total area of the light receiving portions 14 and 15 can be reduced.

Next, a second embodiment of the present invention will be described. In the following description, parts overlapping the first embodiment are denoted by the same reference symbols, and descriptions thereof are omitted except for the case where the description is required in particular. An optical system of the optical pickup device according to the second embodiment is the same as the optical pickup device of the first embodiment 1 except for a relationship between the attachment positions of the two-wavelength composite light source 2 and the light source 3.

Figure 7:
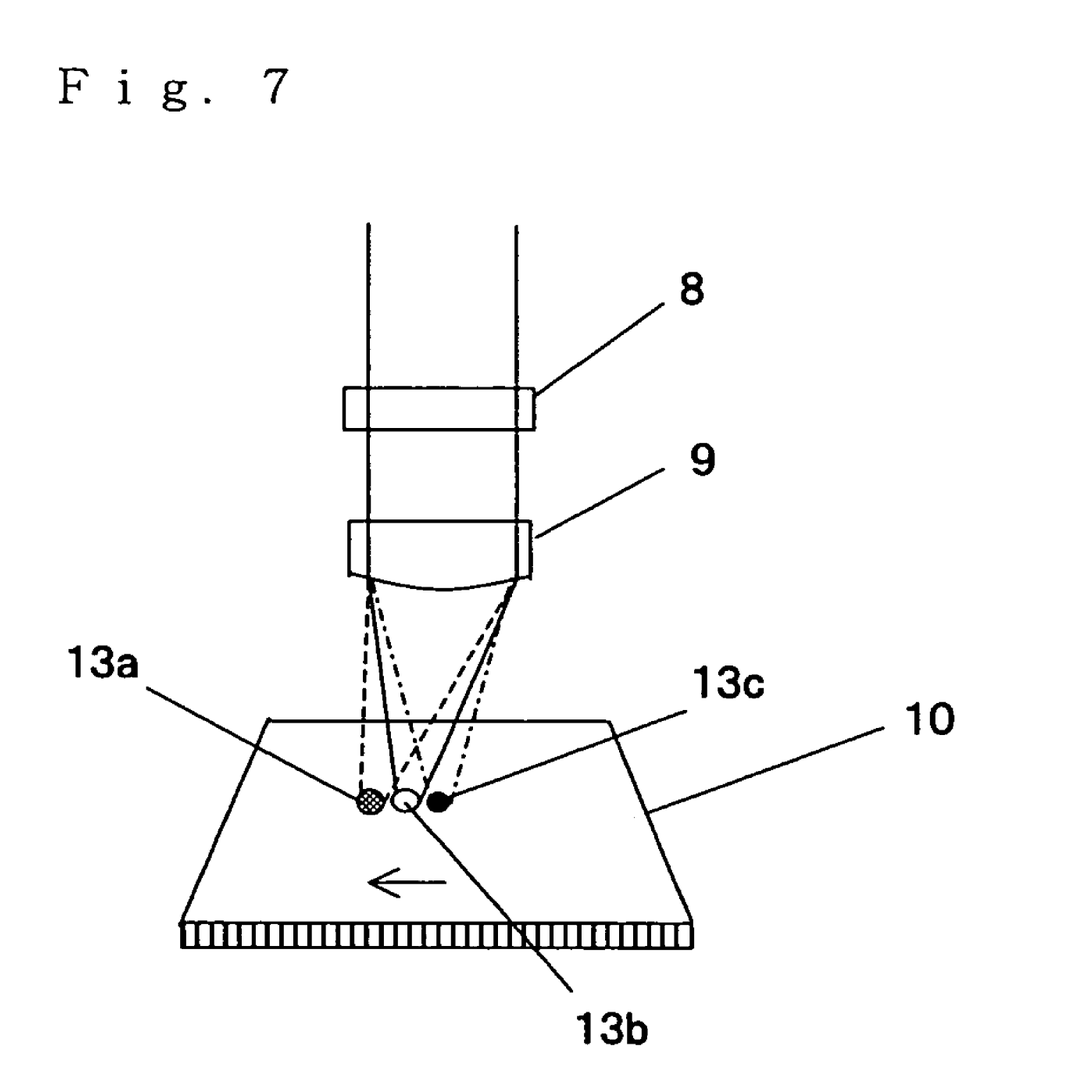
FIG. 7 is an explanatory diagram for explaining beam spots formed on the photo detector by 0 order light generated by diffraction of a hologram element in the second embodiment.

As shown in FIG. 7, the second spot 13b formed on the photo detector 10 by the 0 order light of the laser beam for a DVD does not overlap the third spot 13c formed on the photo detector 10 by the 0 order light of the laser beam for a BD. The second spot 13b is shifted in the same direction (as shown in FIG. 7 by an arrow) as the diffraction direction of the +1st diffracted light 12a (see FIG. 1) generated by the diffraction of the laser beams from the light sources 2 and 3 in the hologram element 8. Then, the first spot 13a formed on the photo detector 10 by the 0 order light of the laser beam for a CD is shifted from the second spot 13b in the same direction (as shown in FIG. 7 by an arrow) as the diffraction direction of the above-mentioned +1st diffracted light 12a. In this way, a relationship between positions of the two-wavelength composite light source 2 and the light source 3 is adjusted.

Note that FIG. 7 is an explanatory diagram for explaining a relationship between positions of the beam spots formed on the photo detector 10 by the 0 order light of the laser beams that are emitted from the two-wavelength composite light source 2 and the light source 3 and pass the hologram element 8 in the second embodiment.

Figure 8:
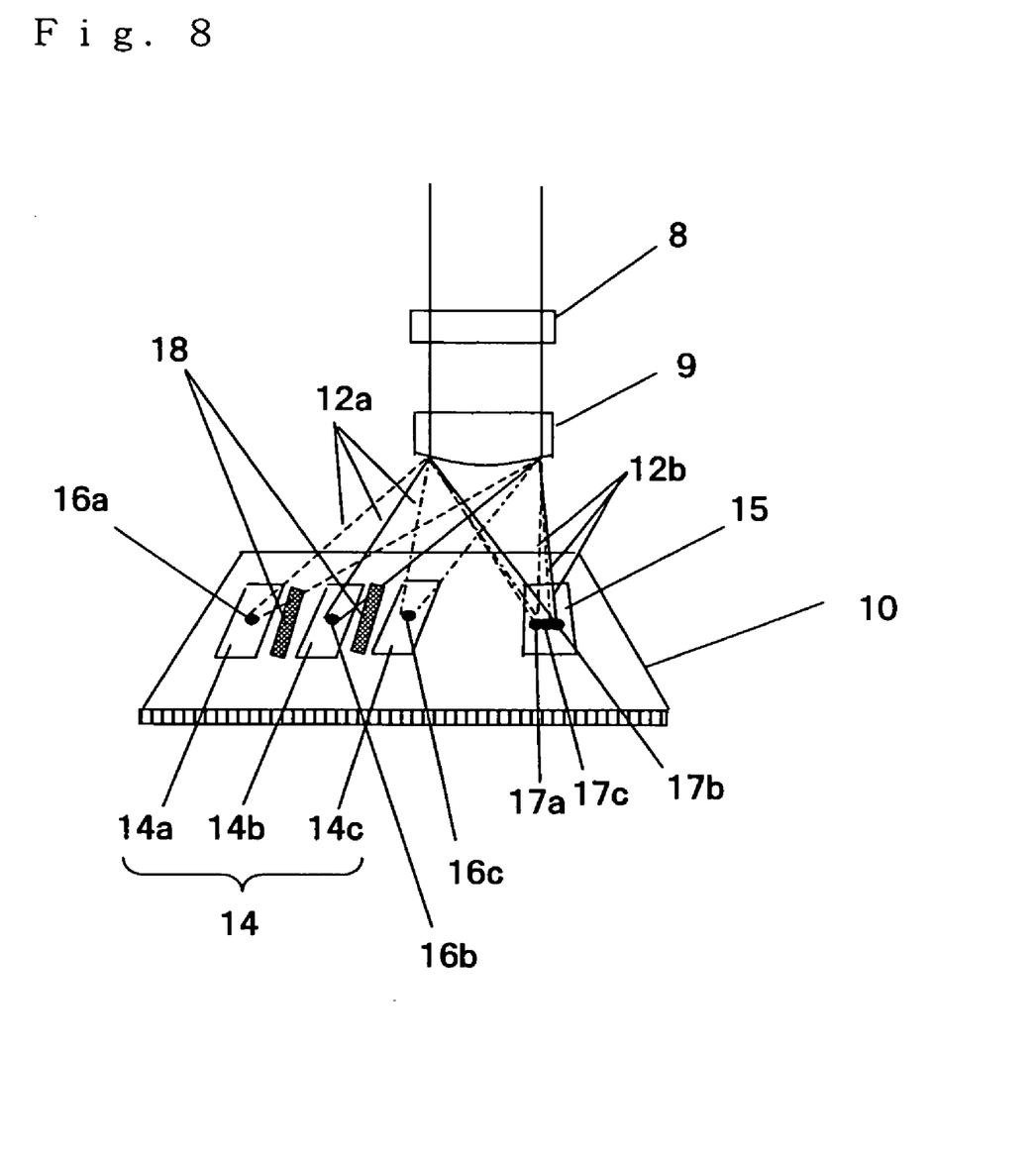
FIG. 8 is a schematic diagram showing schematically that ±1st order light generated by diffraction in the hologram element is received by a light receiving portion of the optical pickup device of the second embodiment.

An action when the two-wavelength composite light source 2 and the light source 3 are arranged as described above will be described. FIG. 8 is a schematic diagram showing schematically that the +1st diffracted light 12a and the −1st order light 12b generated by diffraction of the laser beams for a CD, for a DVD and for a BD in the hologram element 8 are received by the light receiving portions 14 and 15 provided to the photo detector 10 of the optical pickup device 1 in this embodiment.

As shown in FIG. 8, positions 17a, 17b and 17c of the spots formed on the light receiving portion 15 by the −1st order light 12b of the laser beams for a CD, for a DVD and for a BD gather substantially at one point in the second embodiment. For this reason, an area of the light receiving portion 15 on the −1st order light side can be reduced compared with the case of FIG. 5.

On the other hand, positions 16a, 16b and 16c of the spots formed on the light receiving portion 14 by the +1st diffracted light 12a of the laser beams for a CD, for a DVD and for a BD are separated with a large distance between them as shown in FIG. 7. Therefore, it is necessary to increase an area of the light receiving portion 14 on the +1st diffracted light 12a side compared with the case of FIG. 5. However, in the second embodiment, the light receiving position for receiving the +1st diffracted light 12a of the laser beam for a CD, the light receiving position for receiving the +1st diffracted light 12a of the laser beam for a DVD and the light receiving position for receiving the +1st diffracted light 12a of the laser beam for a BD are separated with an adequate distance between them. Therefore, the light receiving portion 14 can be divided into a light receiving area 14a for receiving the +1st diffracted light of the laser beam for a CD, a light receiving area 14b for receiving the +1st diffracted light of the laser beam for a DVD and a light receiving area 14c for receiving the +1st diffracted light of the laser beam for a BD. Thus, compared with the case of FIG. 5, it is almost unnecessary to increase an area of the light receiving portion 14.

Therefore, a total area of the light receiving portions 14 and 15 of the photo detector 10 provided to the optical pickup device 1 of the second embodiment can be reduced compared with the case of FIG. 5. Then, a gap portion 18 is generated when the light receiving portion 14 is divided, and an optoelectronic integrated circuit (OEIC, not shown) is disposed at the gap portion 18. For this reason, the optoelectronic integrated circuit can be disposed on the photo detector 10 efficiently so that the photo detector 10 can be downsized.

In the second embodiment described above, the position of the second spot 13b generated by the laser beam for a DVD is shifted from the position of the third spot 13c generated by the laser beam for a BD in the same direction as the diffraction direction of the +1st diffracted light 12a, and the position of the first spot 13a generated by the laser beam for a CD is shifted from the position of the second spot 13b in the same direction as the diffraction direction of the +1st diffracted light 12a. However, the present invention is not limited to this structure. It is possible to structure so that the position of the second spot 13b generated by the laser beam for a DVD is shifted from the third spot 13c generated by the laser beam for a BD in the same direction as the diffraction direction of the −1st order light 12a, and that the position of the first spot 13a generated by the laser beam for a CD is shifted from the second spot 13b in the same direction as the diffraction direction of the −1st order light 12a.

Furthermore, the two-wavelength composite light source 2 used in the second embodiment has a structure for emitting laser beams for a CD and for a DVD. However, Without being limited to this structure, it is possible to modify the structure within a scope of the object of the present invention. In other words, for example, the two-wavelength composite light source may have a structure for emitting laser beams for a DVD and for a BD. In this case, an attachment position of the two-wavelength composite light source may be adjusted so that the spot positions of the second spot 13b (see FIG. 6) generated by the laser beam for a DVD is shifted from the position of the first spot 13a (see FIG. 6) generated by the laser beam for a CD (that is emitted from the light source supporting the single wavelength) in the same direction as the diffraction direction of the +1st diffracted light 12a, and that the position of the third spot 13c (see FIG. 6) generated by the laser beam for a BD is shifted from the position of the second spot 13b in the same direction as the diffraction direction of the +1st diffracted light 12a.

Figure 9:
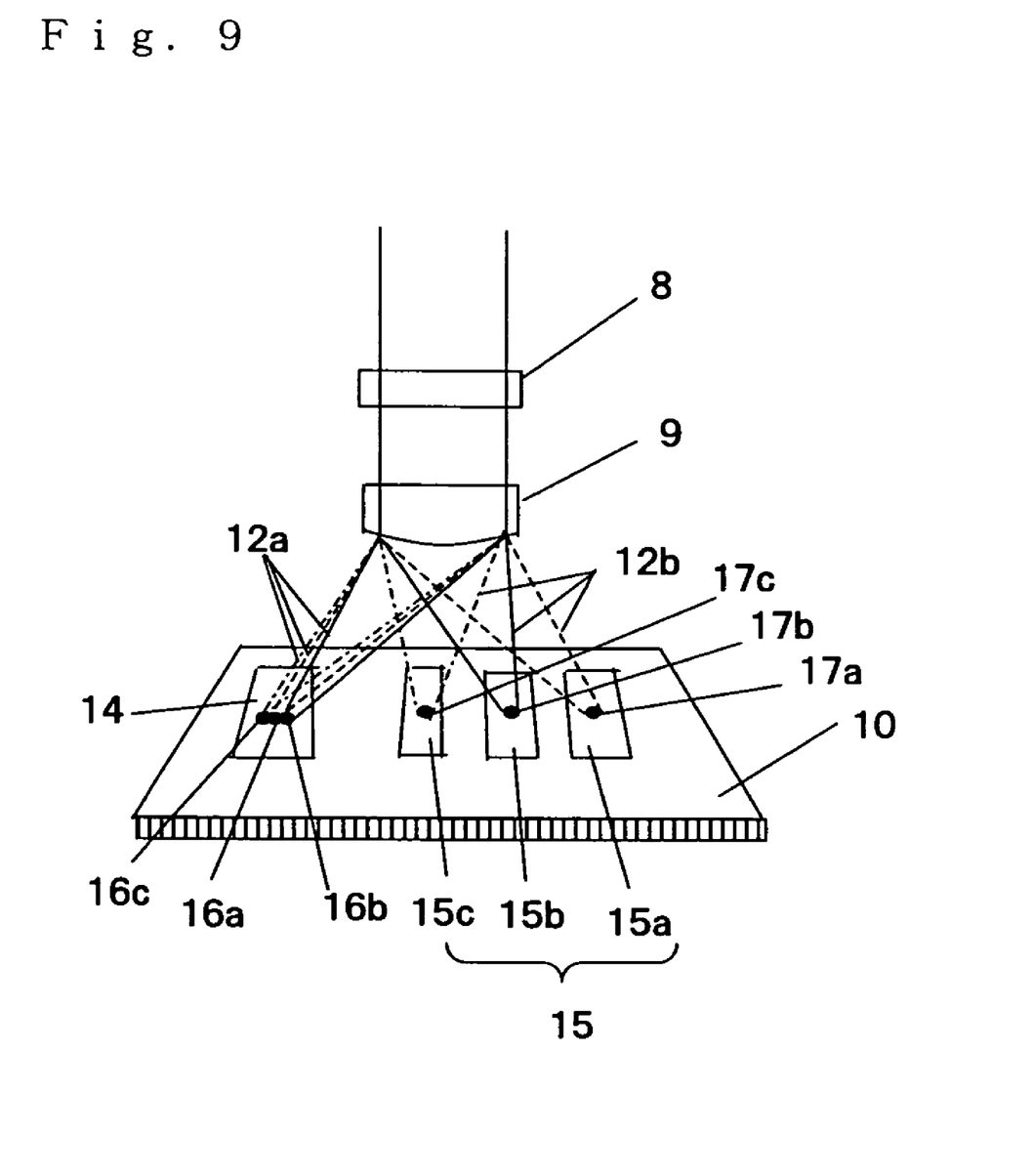
FIG. 9 is a schematic diagram showing a variation of the optical pickup device of the second embodiment.

In this case, as shown in FIG. 9, positions 16a, 16b and 16c of the spots formed on the light receiving portion 14 by the +1st diffracted light 12a of the laser beams for a CD, for a DVD and for a BD gather substantially at one point. Therefore, an area of the light receiving portion 14 on the +1st diffracted light 12a side can be reduced. On the other hand, the light receiving position for receiving the −1st order light 12b of the laser beam for a CD, the light receiving position for receiving the −1st order light 12b of the laser beam for a DVD and the light receiving position for receiving the −1st order light 12b of the laser beam for a BD are separated with an adequate distance between them. Therefore, the light receiving portion 15 is divided into a light receiving area 14a for receiving the −1st order light 12b of the laser beam for a CD, a light receiving area 14b for receiving the −1st order light 12b of the laser beam for a DVD and a light receiving area 14c for receiving the −1st order light 12b of the laser beam for a BD. Thus, compared with the case of FIG. 5, it is almost unnecessary to increase an area of the light receiving portion 14.

In this embodiment, the optical pickup device is provided with the light source having a structure using the two-wavelength composite light source 2 and the light source 3 emitting a single wavelength light. Without being limited to this structure, however, it is possible to modify the structure within a scope of the object of the present invention. In other words, for example, it is possible to use a light source emitting a single wavelength light for each of the three wavelengths. Furthermore, although the optical pickup device in this embodiment supports a CD, a DVD and a BD as the optical recording media, the present invention can be applied to an optical pickup device that supports other optical recording media.

As described above, the present invention can reduce a size of the light receiving portion of the photo detector in the optical pickup device that supports three different wavelengths and includes the hologram element for generating a servo control signal. Therefore, the photo detector can be downsized and a cost of manufacturing the optical pickup device can be reduced.

In addition, since the two-wavelength composite light source is used for the light source, a size of the light receiving portion of the photo detector can be downsized easily by adjusting an attachment angle of the two-wavelength composite light source.

What is claimed is:

1. An optical pickup device, comprising:
   three light sources having different wavelengths;
   a condenser lens for condensing light emitted from the light sources onto a recording surface of the optical recording medium;
   a hologram element for diffracting light reflected by the recording surface after condensed by the condenser lens; and
   a photo detector having two light receiving portions for receiving separately +1st order light and −1st order light of the light diffracted by the hologram element, wherein
   the three light sources include a first light source, a second light source and a third light source in descending order of wavelength thereof,
   light emitted from the first through the third light sources are referred to as first light, second light and third light, respectively, and
   light spots formed on the photo detector by 0 order light of the diffracted light of the first through the third light are referred to as a first spot, a second spot and a third spot, respectively, then
   the three light sources is disposed so that a position of either one of the first spot and the third spot matches substantially a position of the second spot, and a position of the other is shifted from the position of the second spot in either one of two diffraction directions including a diffraction direction of the +1st order light and a diffraction direction of the −1st order light,
   if the positions of the second spot and the third spot match substantially each other, one of the light receiving portions that exists on the side where the first spot is shifted from the second spot is divided into a light receiving area for receiving 1st order diffracted light of the first light and a light receiving area for receiving 1st order diffracted light of the second light and the third light, and
   if the positions of the second spot and the first spot match substantially each other, one of the light receiving portions that exists on the side opposite to the side where the third spot is shifted from the second spot is divided into a light receiving area for receiving 1st order diffracted light of the third light and a light receiving area for receiving 1st order diffracted light of the first light of the second light.

2. The optical pickup device according to claim 1, wherein the first light source and the second light source are integrated to form a two-wavelength composite light source so that positions of the second spot and the third spot match substantially each other.

3. An optical pickup device, comprising:
   three light sources having different wavelengths;
   a condenser lens for condensing light emitted from the light sources onto a recording surface of the optical recording medium;
   a hologram element for diffracting light reflected by the recording surface after condensed by the condenser lens; and a photo detector having two light receiving portions for receiving separately +1st order light and −1st order light of the light diffracted by the hologram element, wherein the three light sources include a first light source, a second light source and a third light source in descending order of wavelength thereof, light emitted from the first through the third light sources are referred to as first light, second light and third light, respectively, light spots formed on the photo detector by 0 order light of the diffracted light of the first through the third light are referred to as a first spot, a second spot and a third spot, respectively, then the three light sources is disposed so that when one of the first spot and the third spot is regarded as a reference spot, a position the second spot is shifted from a position of the reference spot in either one of two diffraction directions including a direction of the +1st order light and a direction of the −1st order light, while a position of the other spot that is not the reference spot is shifted from a position of the second spot in the same direction as the shift of the second spot, if the third spot is regarded as the reference spot, one of the light receiving portions that exists on the side where the second spot is shifted is divided into three light receiving areas for receiving 1st order diffracted light of the first through the third light separately, and if the first spot is regarded as the reference spot, one of the light receiving portions that exists on the side opposite to the side where the second spot is shifted is divided into three light receiving areas for receiving the 1st order diffracted light of the first through the third light separately.

4. The optical pickup device according to claim 3, wherein the first light source and the second light source are integrated to form a two-wavelength composite light source so that the reference point is the third spot.

5. The optical pickup device according to claim 1, further comprising an optoelectronic integrated circuit disposed in a gap portion formed between the light receiving areas for processing an optical signal and an electric signal of the photo detector.

6. The optical pickup device according to claim 2, further comprising an optoelectronic integrated circuit disposed in a gap portion formed between the light receiving areas for processing an optical signal and an electric signal of the photo detector.

7. The optical pickup device according to claim 3, further comprising an optoelectronic integrated circuit disposed in a gap portion formed between the light receiving areas for processing an optical signal and an electric signal of the photo detector.

8. The optical pickup device according to claim 4, further comprising an optoelectronic integrated circuit disposed in a gap portion formed between the light receiving areas for processing an optical signal and an electric signal of the photo detector.

* * * * *